US009897050B2

(12) United States Patent
Baldwin et al.

(10) Patent No.: US 9,897,050 B2
(45) Date of Patent: Feb. 20, 2018

(54) AIR FILTRATION SYSTEM FOR AN ENGINE

(71) Applicant: FORD GLOBAL TECHNOLOGIES, LLC, Dearborn, MI (US)

(72) Inventors: Jason Baldwin, Braintree (GB); Jayne Hyde, Billericay (GB); Roger Khami, Troy, MI (US); Preet Kamal Virk, Canton, MI (US); Robert Joseph Mohan, Canton, MI (US); Joseph Matthew McCann, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 186 days.

(21) Appl. No.: 14/556,363

(22) Filed: Dec. 1, 2014

(65) Prior Publication Data
US 2015/0159599 A1 Jun. 11, 2015

(30) Foreign Application Priority Data
Dec. 11, 2013 (GB) .................................. 1321933.2

(51) Int. Cl.
B01D 46/00 (2006.01)
F02M 35/024 (2006.01)
(Continued)

(52) U.S. Cl.
CPC ......... F02M 35/024 (2013.01); B01D 46/002 (2013.01); B01D 46/0043 (2013.01); F02M 35/0216 (2013.01)

(58) Field of Classification Search
CPC .... B01D 46/521; B01D 46/00; F02M 35/024; F02M 35/04; F02M 35/0215; F02M 35/08; F01M 35/02416
(Continued)

(56) References Cited

U.S. PATENT DOCUMENTS 4,861,359 A * 8/1989 Tettman ............. B01D 46/0031
123/198 E
5,251,712 A * 10/1993 Hayashi ................. B60K 13/02
180/68.3
(Continued)

FOREIGN PATENT DOCUMENTS

DE 10053145 A1 5/2002
DE 102011117638 A1 5/2013
(Continued)

OTHER PUBLICATIONS

Search Report for British application No. GB1321933.2 dated Jun. 12, 2014.
(Continued)

Primary Examiner — T. Bennett McKenzie
Assistant Examiner — Minh-Chau Pham
(74) Attorney, Agent, or Firm — Greg Brown; King & Schickli, PLLC

(57) ABSTRACT

An air filtration system (100) for an engine. The air filtration system (100) includes a main filter assembly (102) configured to filter air from a first dirty air inlet (110), the main filter assembly (102) defining a dirty air side (112) of the main filter assembly (102) and a clean air side (114) of the main filter assembly (102). The air filtration system further includes an auxiliary filter assembly (104) configured to filter air from a second dirty air inlet (116), wherein the auxiliary filter assembly (104) is selectively attachable to the main filter assembly (102) such that when the auxiliary filter assembly (104) is attached air is filtered from the second dirty air inlet (116) to the clean air side (114) of the main filter assembly (102).

16 Claims, 4 Drawing Sheets

(51) Int. Cl.
*F02M 35/04* (2006.01)
*F02M 35/08* (2006.01)
*F02M 35/02* (2006.01)

(58) Field of Classification Search
USPC ...... 55/385.3, 484, 497, 502, 343, 485, 498, 55/472, 482, DIG. 31; 123/198 E
See application file for complete search history.

(56) References Cited

U.S. PATENT DOCUMENTS

| | | | | |
|---|---|---|---|---|
| 5,350,444 A | * | 9/1994 | Gould | B60H 3/0641 454/158 |
| 5,391,212 A | * | 2/1995 | Ernst | B01D 46/0005 123/198 E |
| 6,007,595 A | * | 12/1999 | Baik | B01D 46/0005 454/187 |
| 6,312,489 B1 | * | 11/2001 | Ernst | B01D 46/0005 55/385.3 |
| 6,425,930 B1 | * | 7/2002 | Wake | B01D 46/0095 123/198 E |
| 6,451,079 B1 | * | 9/2002 | Lange | B01D 46/0002 55/379 |
| 7,393,372 B2 | * | 7/2008 | Cassell | F02M 35/024 123/198 E |
| 7,556,663 B2 | * | 7/2009 | Niakan | B01D 46/0023 55/385.3 |
| 7,637,976 B2 | * | 12/2009 | Dirnberger | B01D 46/10 123/198 E |
| 7,648,546 B2 | * | 1/2010 | Haberkamp | B01D 46/522 210/493.1 |
| 7,879,125 B2 | * | 2/2011 | Haberkamp | B01D 46/522 210/487 |
| 8,211,197 B2 | * | 7/2012 | Srinivasan | F02M 35/024 55/385.3 |
| 2011/0023427 A1 | * | 2/2011 | Srinivasan | F02M 35/024 55/385.3 |
| 2011/0232242 A1 | * | 9/2011 | Champion | B01D 46/002 55/483 |
| 2012/0204846 A1 | * | 8/2012 | Schultz | F02M 25/06 123/573 |
| 2015/0345807 A1 | * | 12/2015 | Capellmann | B60H 1/00028 55/467 |
| 2016/0090946 A1 | * | 3/2016 | Tomlin | F02M 35/02483 55/486 |
| 2016/0090947 A1 | * | 3/2016 | Tomlin | F02M 35/0245 55/482 |

FOREIGN PATENT DOCUMENTS

DE 102013224878 A1 6/2014
EP 2366885 A2 9/2011

OTHER PUBLICATIONS

English machine translation of the description for DE102013224878.

* cited by examiner

AIR FILTRATION SYSTEM FOR AN ENGINE

TECHNICAL FIELD

This invention relates to an air filtration system for an engine and particularly, but not exclusively, relates to an air filtration system comprising a main filter assembly and an auxiliary filter assembly.

BACKGROUND

An internal combustion engine of a vehicle requires an adequate supply of filtered, fresh air. Accordingly, air from the atmosphere may be drawn through a particle filter to remove dust and other particulates before the air enters the air intake of the engine. For vehicles operating in temperate climates, a single particle filter may provide many months of adequate air filtration before the filter becomes clogged and a replacement is needed. During severe weather conditions, however, the filter may clog prematurely, thereby restricting air flow into the engine and degrading engine performance. Such severe weather conditions may include, for example, very snowy or dusty conditions.

One solution to the problem noted above is to install a specialized grille cover on the vehicle to prevent entry of snow and/or dust into an air filtration system of the vehicle. However, such grille covers are matched specifically to the front-end configuration of the vehicle on which it is installed and may, therefore, be expensive to produce. Furthermore, the vehicle operator may have to install and remove the grille cover repeatedly in response to changing weather conditions, causing dissatisfaction.

It is known to provide air filtration systems adapted to supply sufficient clean air to the intake of the engine when the air filtration system becomes clogged or blocked. Such air filtration systems may comprise a housing that is configured to partition a filter into a main portion and an auxiliary portion, wherein an auxiliary air inlet may be configured to direct air to the auxiliary portion of the filter upon the main portion of the filter becoming blocked.

However, air filtration systems adapted for operation in severe weather conditions may be more expensive and more difficult to service than a standard air filtration system configured for use in temperate climates. Furthermore, a separate design must be produced in order to manufacture the air filtration system adapted for operation in severe weather conditions owing to the required partition between the main portion and an auxiliary portion of the filter.

The present invention seeks to address these issues.

SUMMARY

According to an aspect of the present invention there is provided an air filtration system for an engine, for example an engine of a vehicle, the air filtration system comprising: a main filter assembly configured to filter air from a first dirty air inlet, the main filter assembly defining a dirty air side of the main filter assembly and a clean air side of the main filter assembly; and an auxiliary filter assembly configured to filter air from a second dirty air inlet, wherein the auxiliary filter assembly is selectively attachable to the main filter assembly such that when the auxiliary filter assembly is attached air is filtered from the second dirty air inlet to the clean air side of the main filter assembly.

The main filter assembly and the auxiliary filter assembly may be in a parallel arrangement when the auxiliary filter assembly is attached to the main filter assembly. For example, parallel flow streams through the main filter assembly and the auxiliary filter assembly may combine at the clean air side of the main filter assembly.

The main filter assembly may comprise a housing defining a chamber in which a main filter may be supported. The main filter assembly may comprise one or more main duct members configured to flow air to and/or from the housing. The auxiliary filter assembly may be selectively attachable to the housing and/or the duct members.

The auxiliary filter assembly may be selectively attachable over at least one opening of the housing and/or the duct members. The openings may be configured to fluidically connect the second dirty air inlet to the clean air side of the main filter assembly. The auxiliary filter assembly may be slidably attachable to the housing and/or the duct members. The auxiliary filter assembly may be repeatedly attachable to and detachable from the housing and/or the main duct members. The main filter assembly may comprise one or more removable cover members configured to cover the openings and prevent air flow between the second dirty air inlet to the clean air side of the main filter assembly, for example when the auxiliary filter assembly is not required.

The air filtration system may comprise a sealing element between the auxiliary filter assembly and the main filter assembly housing, the main duct members and/or the removable cover members.

The auxiliary filter assembly may comprise an auxiliary housing, an auxiliary filter, a flow restrictor and/or one or more auxiliary duct members. The flow restrictor may comprise one or more foam elements. The auxiliary filter assembly may comprise an auxiliary cover member configured to prevent the flow of air from the second dirty air inlet to the clean air side of the main filter assembly. The first dirty air inlet may be configured to draw in at least a portion of air from a first region of air outside of the vehicle, for example from a region of air near to a front grille of the vehicle. The second dirty air inlet may be configured to draw in at least a portion of air from a second region of air outside of the vehicle, for example a side grille of the vehicle. The second dirty air inlet may be configured to draw in at least a portion of air located within an engine bay of the vehicle.

According to another aspect of the present invention there is provided an auxiliary filter assembly for an air filtration system of an engine, the auxiliary filter assembly being selectively attachable to a main filter assembly configured to filter air from a first dirty air inlet, the main filter assembly defining a dirty air side of the main filter assembly and a clean air side of the main filter assembly, wherein the auxiliary air filter assembly is configured to filter air from a second dirty air inlet such that when the auxiliary filter assembly is attached to the main filter assembly air is filtered from the second dirty air inlet to the clean air side of the main filter assembly.

According to another aspect of the present invention there is provided a main filter assembly for an air filtration system of an engine, the main filter assembly configured to filter air from a first dirty air inlet, the main filter assembly defining a dirty air side of the main filter assembly and a clean air side of the main filter assembly, wherein the main filter assembly is configured such that an auxiliary filter assembly is selectively attachable to the main filter assembly, the auxiliary air filter assembly being configured to filter air from a second dirty air inlet such that when the auxiliary filter assembly is attached to the main filter assembly air is filtered from the second dirty air inlet to the clean air side of the main filter assembly.

According to another aspect of the present invention there is provided an air filtration kit comprising: one or more main filter assemblies configured to filter air from a first dirty air inlet, the main filter assembly defining a dirty air side of the main filter assembly and a clean air side of the main filter assembly; and one or more auxiliary filter assemblies configured to filter air from a second dirty air inlet, wherein the auxiliary filter assembly is selectively attachable such that when the auxiliary filter assembly is attached air is filtered from the second dirty air inlet to the clean air side of the main filter assembly.

According to another aspect of the present invention there is provided a method of filtering air for an engine, the method comprising: filtering air from a first dirty air inlet using a main filter assembly, the main filter assembly defining a dirty air side of the main filter assembly and a clean air side of the main filter assembly; and selectively filtering air from a second dirty air inlet using an auxiliary filter assembly, wherein the auxiliary filter assembly is selectively attachable such that when the auxiliary filter assembly is attached air is filtered from the second dirty air inlet to the clean air side of the main filter assembly.

According to another aspect of the present invention there is provided an engine or vehicle comprising one or more of the above-mentioned air filtration systems.

BRIEF DESCRIPTION OF THE DRAWING

For a better understanding of the present disclosure, and to show more clearly how it may be carried into effect, reference will now be made, by way of example, to the accompanying drawing, in which.

DETAILED DESCRIPTION

Figure 1:
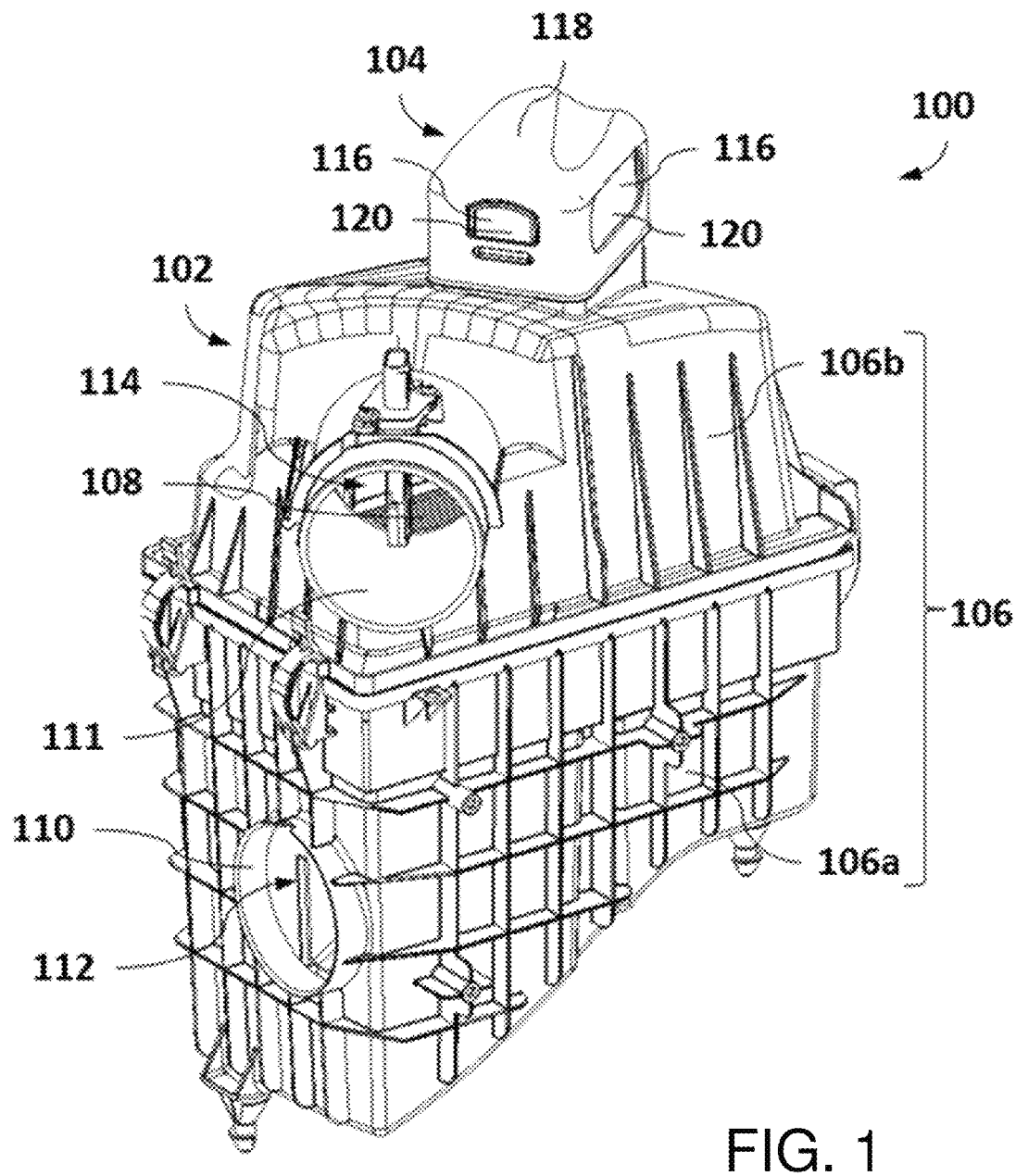
FIG. 1 shows an air filtration system comprising a main filter assembly and an auxiliary filter assembly.

FIG. 1 shows an air filtration system 100 for an engine of a vehicle according to an embodiment of the present invention. The air filtration system 100 comprises a main filter assembly 102 and an auxiliary filter assembly 104, wherein the auxiliary filter assembly 104 is selectively attachable to the main filter assembly 102. When the auxiliary filter assembly 104 is attached, the air filtration system 100 is configured to provide sufficient filtered air to the engine if a filter and/or inlet of the main filter assembly 102 become clogged, for example during snowy or dusty conditions. However, the air filtration system 100 need not be provided with the auxiliary filter 104 when the vehicle is operating in temperate climates.

Further, the system may be used in virtually any vehicular application where reduced flow restriction, increased filter capacity, and reduced noise/vibration in the air intake system are desired.

In the example shown in FIG. 1, the main filter assembly 102 comprises a housing 106 defining a chamber in which a main filter 108 is supported. The housing 106 comprises a first housing portion 106a and a second housing portion 106b, which, when assembled, support the main filter 108 therebetween. The first housing portion 106a comprises a first dirty air inlet 110 and the second housing portion 106b comprises a clean air outlet 111. The main filter assembly 102 is configured to filter air supplied from the first dirty air inlet 110 to the clean air outlet 111. The main filter assembly 102 defines, therefore, a dirty air side 112 of the main filter assembly 102, which is enclosed by the first housing portion 106a, and a clean air side 114 of the main filter assembly 102, which is enclosed by the second housing portion 106b.

The auxiliary filter assembly 104 is configured to be selectively attachable to the main filter assembly 102 such that when the auxiliary filter assembly 104 is attached air is filtered from a second dirty air inlet 116 to the clean air side 114 of the main filter assembly 102. The second dirty air inlet 116 may be configured to draw in at least a portion of air located within an engine bay of the vehicle, which for example is less likely to contain snow, dust or other particulate matter.

Figure 2A:
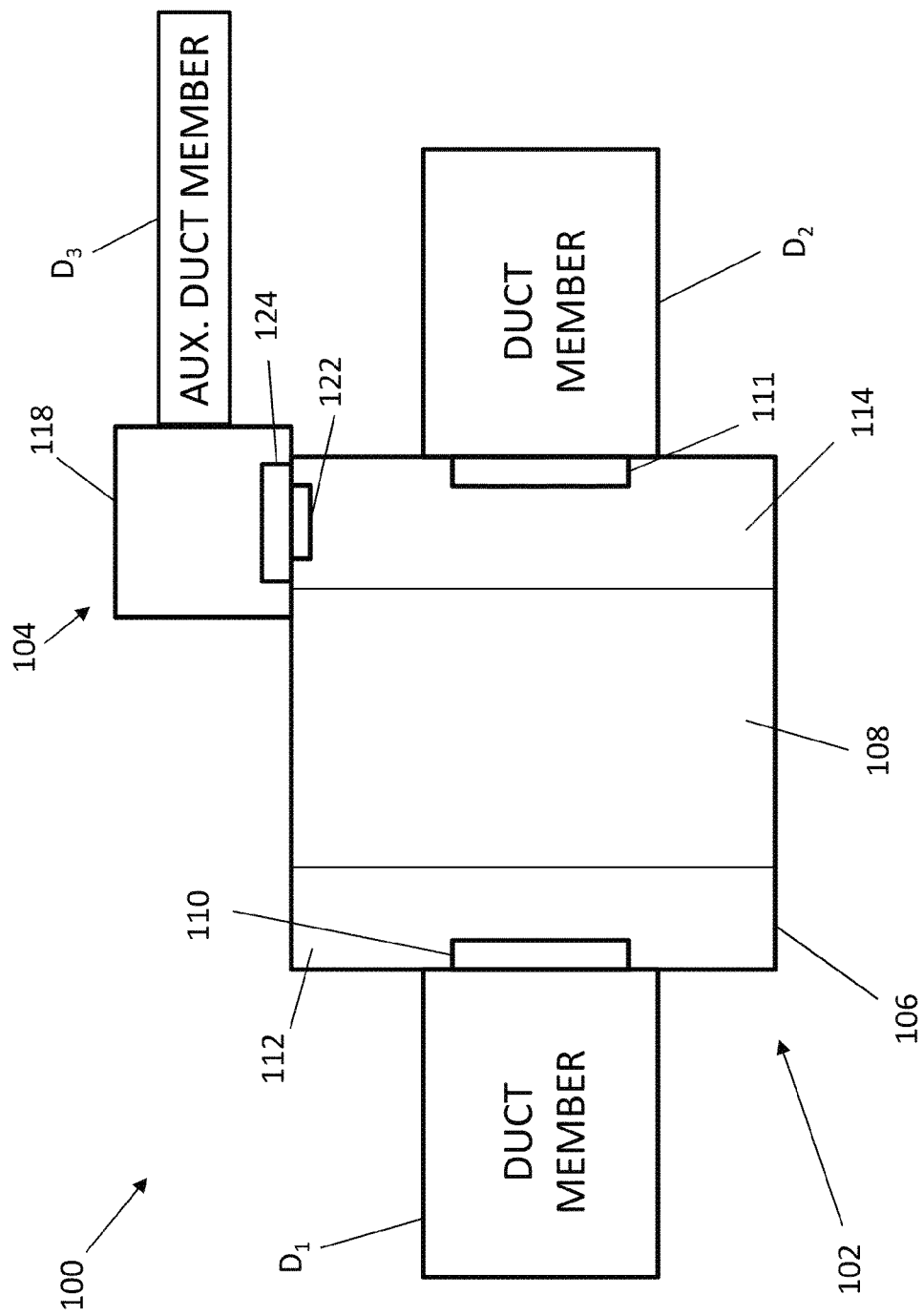
FIGS. 2a and 2b are schematic block diagrams of two different embodiments of the air filtration system.
Figure 2B:
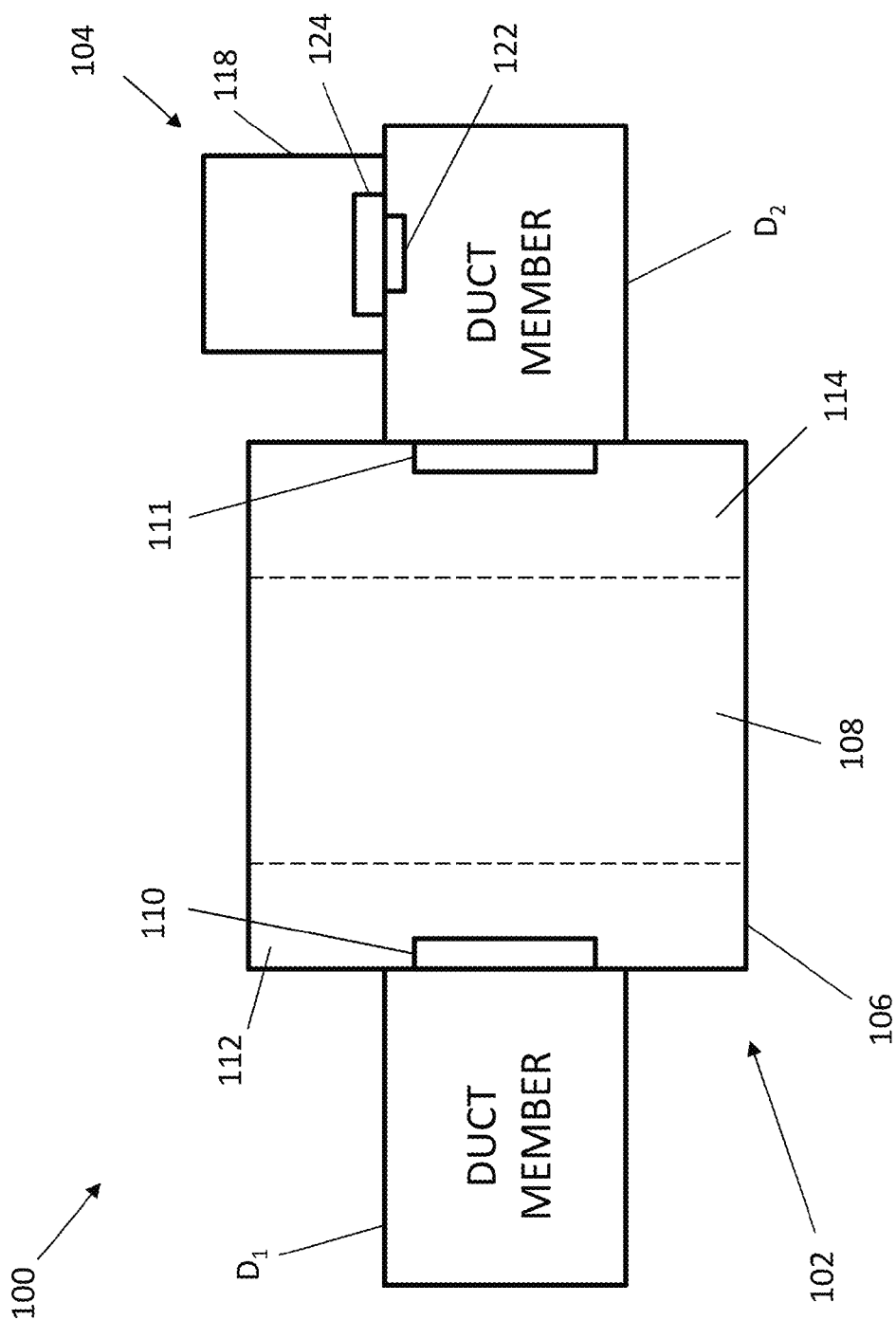

As schematically illustrated in FIGS. 2a and 2b, the main filter assembly 102 may further comprise one or more duct members $D_1$, $D_2$ configured to flow air to and/or from the housing 106. For example, a first main duct member $D_1$ may be configured to flow air between a first region of air outside of the vehicle and the first dirty air inlet 110. A second main duct member $D_2$ may be configured to flow air between the clean air outlet 111 and one or more components of the vehicle, for example an inlet manifold of the engine, a supercharger, a turbocharger and/or any other component that requires a supply of filtered air.

In the example shown in FIG. 1, the auxiliary filter assembly 104 is configured to be selectively attachable to the second housing portion 106b of the main filter assembly 102. It is appreciated, however, that the auxiliary filter assembly 104 may be configured to be selectively attachable to any appropriate part of the main filter assembly 102 that enables air to be filtered from the second dirty air inlet 116 to the clean air side 114 of the main filter assembly 102. For example, the auxiliary filter assembly 104 may be configured to be selectively attachable over at least one opening 122 of the housing 106 and/or the main duct members (see FIGS. 2a and 2b respectively), wherein the openings are configured to fluidically connect the second dirty air inlet 116 to the clean air side 114 of the main filter assembly 102. In an alternative example, the auxiliary filter assembly 104 may be configured to be selectively attachable to the second main duct member $D_2$ configured to flow air between the clean air outlet 111 and one or more components of the vehicle. In another alternative example, the auxiliary filter assembly 104 may be configured to be selectively attachable to the clean air outlet 111 of the second housing portion 106b and the second main duct member such that dirty air may be filtered from the second dirty air inlet 116 to the second main duct member. The air filtration system 100 may further comprise a sealing element 124 between the auxiliary filter assembly 104 and the main filter assembly 102.

In the example shown in FIG. 1, the auxiliary filter assembly 104 is configured to be selectively attachable over the opening in the second housing portion 106b of the main filter assembly 102. In this manner, the main filter assembly 102 and the auxiliary filter assembly 104 are in a parallel arrangement when the auxiliary filter assembly 104 is attached to the main filter assembly 102.

Figure 3:
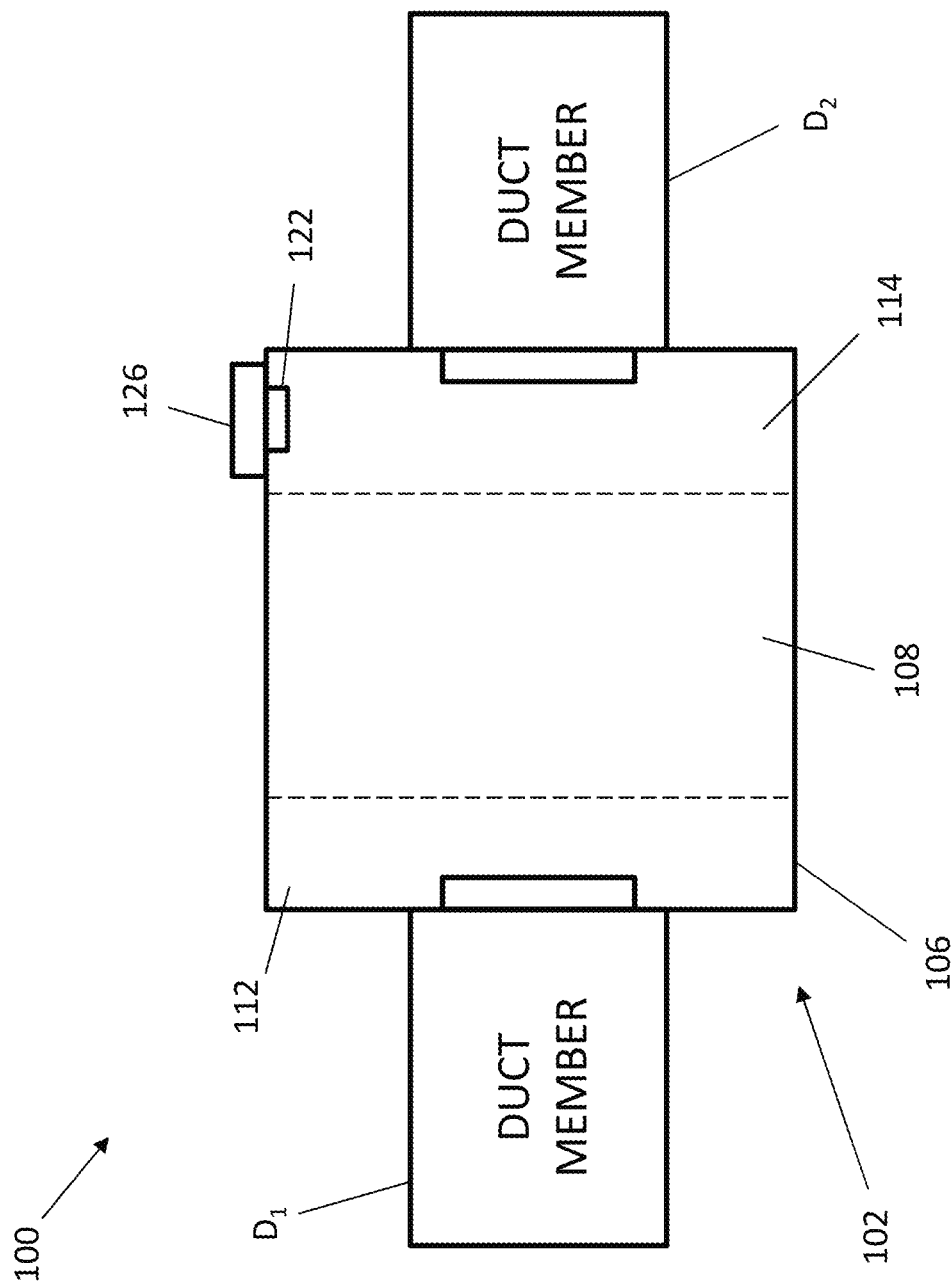
FIG. 3 is a schematic block diagram illustrating the air filtration system with a cover in place over the opening over which the auxiliary filter assembly may be connected to the main filter assembly.

The auxiliary filter assembly 104 may be selectively attached to the main filter assembly 102 during the production of the vehicle when it is expected that the vehicle will be operating in severe weather conditions. Alternatively, the vehicle may be supplied with the auxiliary filter assembly 104 not attached to the main filter assembly 102 and a removable cover 126 may be provided over the opening 122 in place of the auxiliary filter assembly 104 (see FIG. 3). In this manner the auxiliary filter assembly 104 may be selectively attached, for example by the operator of the vehicle, when the vehicle is operating in severe weather conditions.

The main filter assembly 102 may be a common component across a wide range of vehicles such that the air filtration system 100 for use in temperate climates may be easily and quickly converted into the air filtration system 100 for use in severe weather conditions by the attachment of the auxiliary filter assembly 104 to the main filter assembly 102.

The auxiliary filter assembly 104 may be removably attachable to the housing 106 and/or the main duct members of the main filter assembly 102. In the example shown in FIG. 1, the auxiliary filter assembly 104 is slidably attachable to the second housing portion 106*b*, although it is appreciated that the auxiliary filter assembly 104 may be attached to a portion of the main filter assembly 102 using any appropriate attachment means, for example a push-fit attachment, a snap-fit attachment or a threaded attachment, amongst others. One or more locking features may be provided to secure the auxiliary filter assembly 104 to the main filter assembly 102.

The auxiliary filter assembly 104 may further comprise an auxiliary housing 118, an auxiliary filter (not shown), a flow restrictor 120 and/or one or more auxiliary duct members $D_3$ (see FIG. 2*a*). In the example shown in FIG. 1, the auxiliary filter assembly 104 comprises the auxiliary housing 118 configured to support the auxiliary filter and the flow restrictor 120. In other embodiments of the invention, the auxiliary duct members may be configured to flow air to and/or from the auxiliary housing 118. For example, the auxiliary duct member may be configured to flow air between a region of dirty air within the engine bay of the vehicle and the second dirty air inlet 116. In an alternative example, the auxiliary duct member may be configured to flow air between a second region of dirty air outside of the vehicle and the second dirty air inlet 116.

The flow restrictor 120 may be in fluidic communication with the second dirty air inlet 116 and auxiliary filter of the auxiliary filter assembly 104. The flow restrictor 120 is configured to restrict partially the air flow to the auxiliary filter. The flow restrictor 120 may be sized and shaped to fit inside the auxiliary housing 118. The flow restrictor 120 may provide enough restriction to cause the great majority of intake air to flow through the main filter 108 instead of the auxiliary filter as long as the main filter 108 is substantially unclogged. However, the restriction may be small enough so that when the main filter 108 is clogged, as could occur during severe weather conditions, air flow is drawn through the auxiliary filter. The air flow may be sufficient to support combustion in the engine and prevent the engine from stalling.

Furthermore, even under conditions where snow and/or dust accumulate on and clog the main air filter 108, it is unlikely for the auxiliary filter to accumulate a clogging layer of snow and/or dust since the auxiliary filter does not receive a significant air flow unless or until main filter 108 becomes clogged.

In some embodiments, the flow restrictor 120 may include a plurality of macro-scale features, for example orifices, obstructions, screens, vanes, wadding, etc. that restrict the air flow. In other embodiments, the flow-restricting features may be much smaller in size. For example, the flow restrictor may comprise an open-cell flow-restricting foam, in discrete, attached or unattached monoliths or as a single monolith. The pore density of the foam may range approximately from below 40 to above 100 pores per inch (ppi). In one embodiment, the pore density of the foam may be between 40 and 100 ppi, inclusively. In embodiments where absorption of water into the flow restrictor is to be particularly avoided, foam having a pore density of 60 to 80 ppi may be used.

In the example shown in FIG. 1, the flow restrictor 120 comprises a resilient polyurethane foam monolith. The resilient nature of the foam advantageously allows the flow restrictor 120 to be inserted into a pre-formed cavity in the auxiliary housing 118 and be retained there by a retaining element.

The auxiliary filter assembly 104 may further comprise an auxiliary cover member configured to prevent the flow of air from the second dirty air inlet 116 to the clean air side 114 of the main filter assembly 102. For example, the auxiliary cover member may selectively cover the second dirty air inlet 116, be provided between the flow restrictor 120 and the auxiliary filter and/or be provided between the auxiliary filter and the opening in the second housing portion 106*b*. In this manner, air flow through the auxiliary filter assembly 104 may be prevented even when the removable cover is replaced by the auxiliary filter assembly 104. The auxiliary cover member may be configured to be removed from the auxiliary filter assembly 104 without detaching the auxiliary filter assembly 104 from the main filter assembly 102.

It will be appreciated by those skilled in the art that although the invention has been described by way of example with reference to one or more examples, it is not limited to the disclosed examples and that alternative examples could be constructed without departing from the scope of the invention as defined by the appended claims. For example, it will be appreciated that in another embodiment the invention comprises the auxiliary filter assembly, the main filter assembly or an air filtration kit comprising one or more main filter assemblies and one or more auxiliary filter assemblies.

It will also be appreciated that the present invention also provides a method of filtering air for an engine. The method comprises filtering air from a first dirty air inlet using a main filter assembly, the main filter assembly defining a dirty air side of the main filter assembly and a clean air side of the main filter assembly. The method further comprises selectively filtering air from a second dirty air inlet using an auxiliary filter assembly, wherein the auxiliary filter assembly is selectively attachable such that when the auxiliary filter assembly is attached air is filtered from the second dirty air inlet to the clean air side of the main filter assembly.

The invention claimed is:

1. An air filtration system for an engine, the air filtration system comprising:
    a main filter assembly configured to filter air from a first dirty air inlet, the main filter assembly defining a dirty air side of the main filter assembly and a clean air side of the main filter assembly; and
    an auxiliary filter assembly configured to filter air from a second dirty air inlet, wherein the auxiliary filter assembly is selectively attachable directly to the main filter assembly such that when the auxiliary filter assembly is attached air is filtered from the second dirty air inlet to the clean air side of the main filter assembly.

2. An air filtration system according to claim 1, wherein the main filter assembly and the auxiliary filter assembly are in a parallel arrangement when the auxiliary filter assembly is attached to the main filter assembly.

3. An air filtration system according to claim 2, the main filter assembly comprising:

a housing defining a chamber in which a main filter is supported; and one or more main duct members configured to flow air to and/or from the housing, wherein the auxiliary filter assembly is selectively attachable to the housing.

4. An air filtration system according to claim 3, wherein the auxiliary filter assembly is selectively attachable over at least one opening of the housing, wherein the openings are configured to fluidically connect the second dirty air inlet to the clean air side of the main filter assembly.

5. An air filtration system according to claim 4, wherein the auxiliary filter assembly is slidably attachable to the housing.

6. An air filtration system according to claim 5, the air filtration system further comprising a sealing element between the auxiliary filter assembly and the housing and/or the duct members.

7. An air filtration system according to claim 6, wherein the auxiliary filter assembly comprises an auxiliary housing, an auxiliary filter, a flow restrictor and/or one or more auxiliary duct members.

8. An air filtration system according to claim 7, wherein the flow restrictor comprises one or more foam elements.

9. An air filtration system according to claim 1, wherein the auxiliary filter assembly comprises an auxiliary cover member configured to prevent the flow of air from the second dirty air inlet to the clean air side of the main filter assembly.

10. An air filtration system according to claim 1, wherein the first dirty air inlet is configured to draw in at least a portion of air from outside of the vehicle.

11. An air filtration system according to claim 1, wherein the second dirty air inlet is configured to draw in at least a portion of air located within an engine bay of the vehicle.

12. An engine or vehicle including one or more air filtration systems of claim 1.

13. An auxiliary filter assembly for an air filtration system of an engine, the auxiliary filter assembly being selectively attachable directly to a main filter assembly configured to filter air from a first dirty air inlet, the main filter assembly defining a dirty air side of the main filter assembly and a clean air side of the main filter assembly, wherein the auxiliary air filter assembly is configured to filter air from a second dirty air inlet such that when the auxiliary filter assembly is attached to the main filter assembly air is filtered from the second dirty air inlet to the clean air side of the main filter assembly.

14. A main filter assembly for an air filtration system of an engine, the main filter assembly configured to filter air from a first dirty air inlet, the main filter assembly defining a dirty air side of the main filter assembly and a clean air side of the main filter assembly, wherein the main filter assembly is configured such that an auxiliary filter assembly is selectively attachable directly to the main filter assembly, the auxiliary air filter assembly being configured to filter air from a second dirty air inlet such that when the auxiliary filter assembly is attached to the main filter assembly air is filtered from the second dirty air inlet to the clean air side of the main filter assembly.

15. An air filtration kit comprising:

one or more main filter assemblies configured to filter air from a first dirty air inlet, the main filter assembly defining a dirty air side of the main filter assembly and a clean air side of the main filter assembly; and one or more auxiliary filter assemblies configured to filter air from a second dirty air inlet, wherein the auxiliary filter assembly is selectively attachable directly to the main filter assembly such that when the auxiliary filter assembly is attached air is filtered from the second dirty air inlet to the clean air side of the main filter assembly.

16. A method of filtering air for an engine, the method comprising:

filtering air from a first dirty air inlet using a main filter assembly, the main filter assembly defining a dirty air side of the main filter assembly and a clean air side of the main filter assembly; and selectively filtering air from a second dirty air inlet using an auxiliary filter assembly, wherein the auxiliary filter assembly is selectively attachable directly to the main filter assembly such that when the auxiliary filter assembly is attached air is filtered from the second dirty air inlet to the clean air side of the main filter assembly.

\* \* \* \* \*